United States Patent [19]

Ishii

[11] Patent Number: 5,184,342

[45] Date of Patent: Feb. 2, 1993

[54] INFORMATION PROCESSING DEVICE

[75] Inventor: Masaru Ishii, Kamakura, Japan

[73] Assignee: Kabushiki Kaisha Toshiba, Kawasaki, Japan

[21] Appl. No.: 699,713

[22] Filed: May 14, 1991

[30] Foreign Application Priority Data

May 15, 1990 [JP] Japan .................................. 2-125170

[51] Int. Cl.⁵ ...................... G11B 23/00; G11B 13/04
[52] U.S. Cl. .................................... 369/100; 369/13; 369/77.1; 369/77.2
[58] Field of Search ...................... 369/100, 77.1, 77.2, 369/110, 13; 360/114

[56] References Cited

U.S. PATENT DOCUMENTS

| | | | |
|---|---|---|---|
| 4,914,647 | 4/1990 | Ono | 369/77.2 |
| 5,005,093 | 4/1991 | Inoue et al. | 369/77.2 |
| 5,060,207 | 10/1991 | Kaneda et al. | 369/77.1 |
| 5,062,099 | 10/1991 | Odawara et al. | 369/77.1 |
| 5,103,435 | 4/1992 | Nemoto et al. | 369/114 |
| 5,107,484 | 4/1992 | Kawamura et al. | 369/77.2 |
| 5,122,998 | 6/1992 | Mizuno et al. | 360/114 |
| 5,123,004 | 6/1992 | Arai | 369/77.2 |

Primary Examiner—Janice A. Howell
Assistant Examiner—Kiet T. Nguyen
Attorney, Agent, or Firm—Finnegan, Henderson, Farabow, Garrett and Dunner

[57] ABSTRACT

An information processing unit of the present invention stores at least information from an optical disc by directing a laser beam, under the application of a magnetic field, onto the optical disc with the information recorded thereon. The device includes a housing having an access hole through which the optical disc is inserted and a record/playback/erase head for providing an illumination using the laser beam and electromagnet for generating the magnetic field. A movable first guide member is provided for guiding a first holding member for holding a cartridge with the optical disc held therein and second holding member for holding an electromagnet and a fixed second guide member is provided for guiding the first guide member and first holding member. Upon movement of the first guide member, the optical disc being inserted into the housing through an access hole is guided to a position, while being maintained in a predetermined positional relation relative to the electromagnet, where the disc is illuminated with the laser beam coming from the record/playback/erase head upon information playback and the electromagnet is guided to a position where the magnetic field is applied to the optical disc.

23 Claims, 10 Drawing Sheets

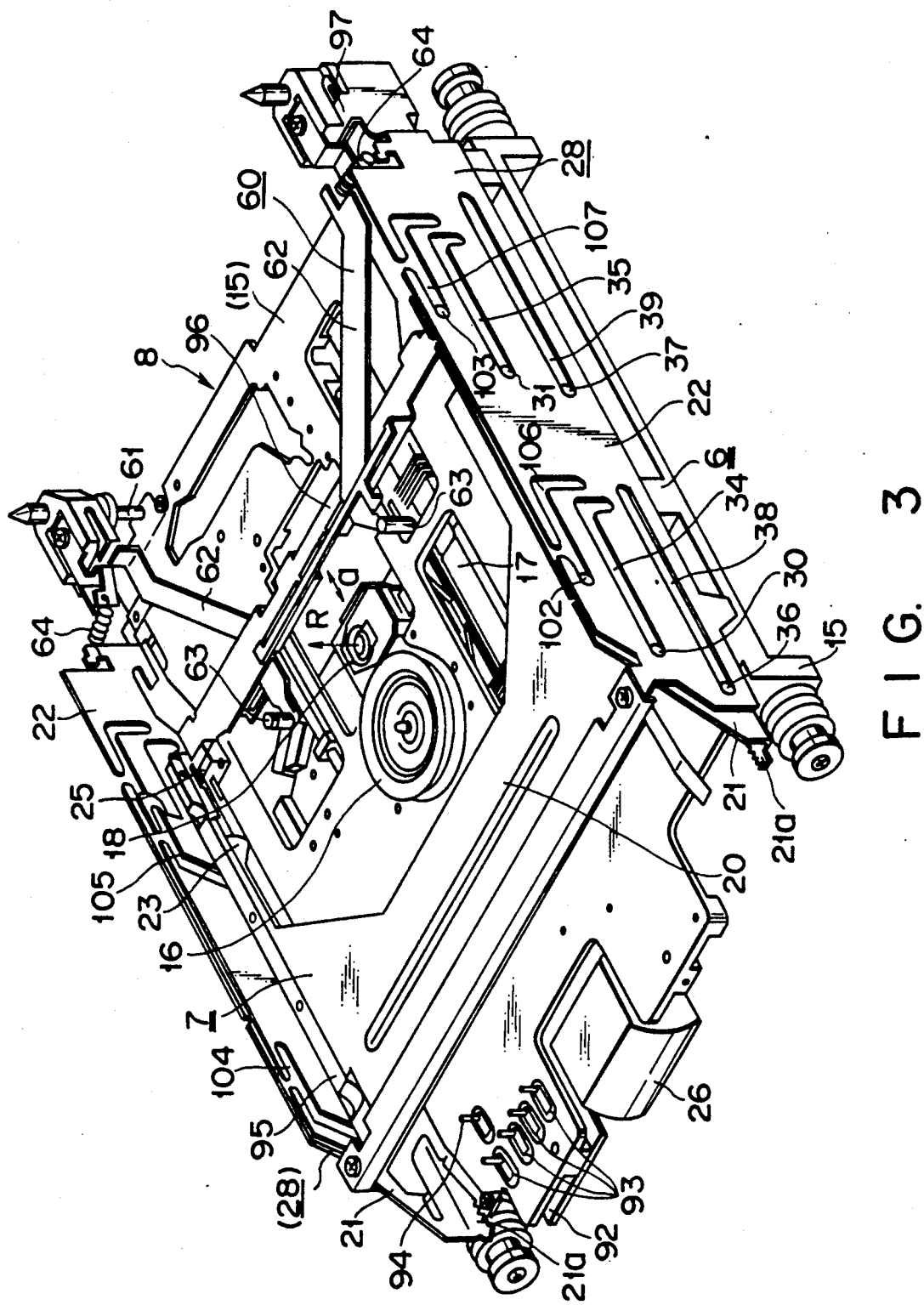
F I G. 3

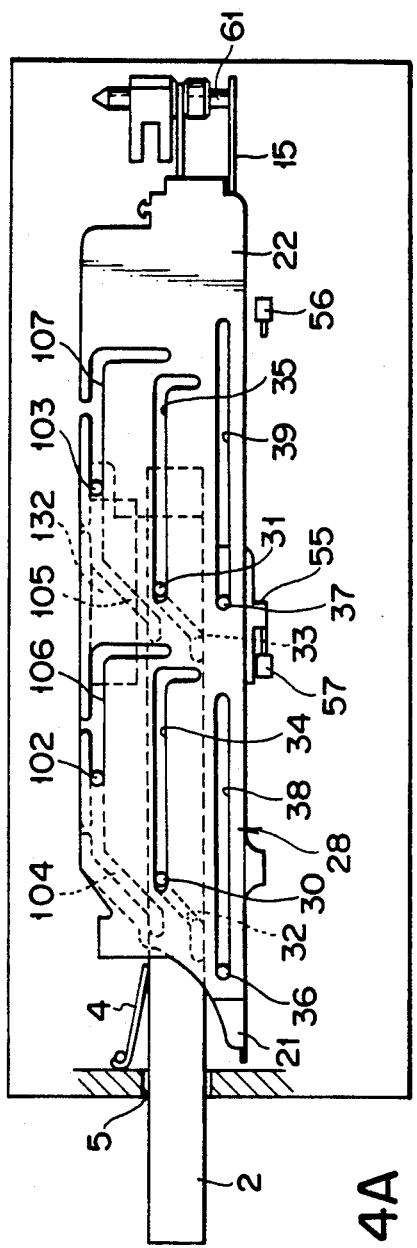
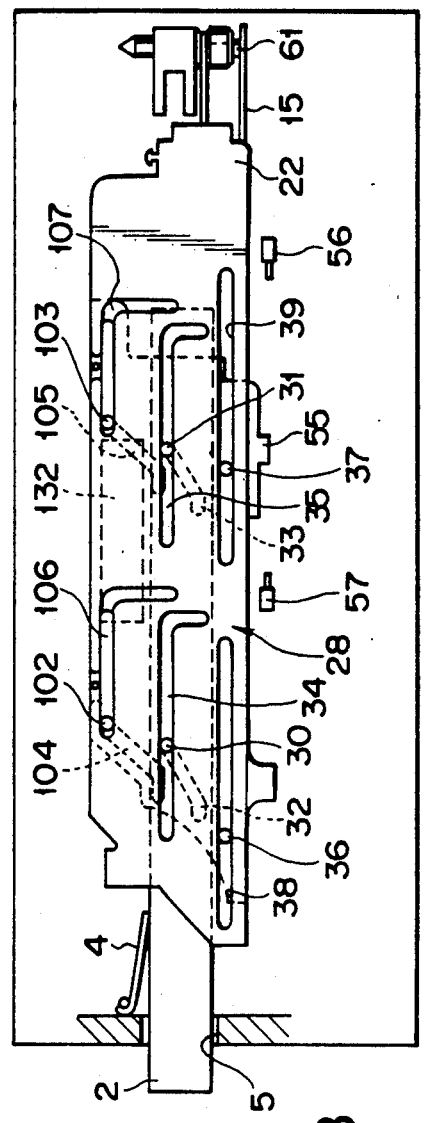
FIG. 4A
FIG. 4B an information storage medium. It is also required that, upon insertion or withdrawal of the cartridge, the magnetic field generating means not be moved to a position where it interferes with the cartridge.

INFORMATION PROCESSING DEVICE

Background of the Invention

1. Field of the Invention

The present invention relates to an information processing device which receives an information storage medium, such as an optical disc, and records, plays back and erases information on and from the information storage medium.

2. Description of the Related Art

Usually, this type of information processing device illuminates an information storage medium with a laser beam under the application of a magnetic field by a magnetic field generating means, such as an electromagnet or permanent magnet, and records and erases information on and from the information storage medium.

It is required in the information processing device that, in order to positively generate a requisite magnetic field upon recording or erasure of information on or from the information storage medium, the magnetic field generating means be moved to a position fairly near the information storage medium or sometimes to a position where it is placed in an interfered state in a cartridge. It is also required that, upon insertion or withdrawal of the cartridge, the magnetic field generating means not be moved to a position where it interferes with the cartridge.

With this type of information processing device, however, a magnetic field generating means is moved in the following manner.

That is, an arm means is provided which is swingable with a given device's position as a center and urged by a spring means normally in a predetermined position. The magnetic field generating means is mounted on the forward end of the arm means. When the arm means is pushed against an urging force of the spring means or released, the arm means is swung to a position nearer the magnetic field generating means or to a position where the magnetic field generating means interferes with the cartridge.

As will be seen from the above, the movement of the magnetic field generating means can be accomplished by a separate mechanism entirely independent of a means for moving the information storage medium.

This arrangement requires more component parts and hence more assembling steps.

It is also difficult to accurately set a distance between the information storage medium and the magnetic field generating means, an aspect which is of final importance. It is, therefore, not possible to perform a stable information processing.

Since, upon movement of the magnetic field generating means, the spring means is urged in an initial-position direction or in a mounting-position direction, the magnetic field generating means is liable to be unstably displaced upon receipt of an external vibration.

SUMMARY OF THE INVENTION

It is accordingly an object of the present invention to provide an information processing device which can improve the exact setting of a magnetic field generating means to an information storage medium and make the magnetic field generating means in the information processing device stable through an improved vibration resistance achieved, and can be readily manufactured at a low cost, while being ensured in its performance, with less number of component parts required.

According to the present invention, there is provided a device for storing information in an information storage medium by directing a light beam with a magnetic field applied to the information storage medium, comprising a light beam generating unit for generating the light beam, a magnetic field generating unit for generating the magnetic field, a housing for housing the light beam generating unit and magnetic field generating unit, the housing having an access hole through which the information storage medium is inserted, a support for supporting both the information storage medium inserted via the access hole into the housing and the magnetic field generating unit such that the information storage medium and magnetic field generating unit are movable along the storage medium insertion direction, and in a direction included to the storage medium insertion direction the support being so provided at the housing as to be movable along the storage medium insertion direction, a movable unit for moving the support means in a direction corresponding to the storage medium insertion direction, and a guide unit for guiding the support, which is moved by the movable unit, in the storage medium insertion direction and for guiding the storage medium to a position where the medium faces the light beam generating unit and the magnetic field generating unit to a position where the magnetic field generating unit faces the light beam generating unit through the storage medium.

According to the information processing device of the present invention, while being held in a predetermined positional relation relative to the magnetic field generating unit, the information storage medium being inserted through the access hole is guided to the position where, upon information playback, it is illuminated with the laser beam coming from the laser beam illumination unit and the magnetic field generating unit is guided to the position where a magnetic field is applied to the information storage medium.

Compared with the conventional magnetic field generating unit moved by an entirely separate mechanism different from a unit for moving the information storage medium, the magnetic field generating unit can be set relative to the information storage medium in an accurate positional relation and stably located in the present device, ensuring an enhanced vibration resistance and less number of component parts. According to the present invention, therefore, a high performance device can be readily manufactured at low costs.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a perspective view showing the present information processing device with an electromagnetic holder detached;

FIG. 4A is an explanatory view showing a relative positional relation upon movement of loading cam members in the loading mechanism of a major mechanism of the present information processing device;

FIG. 4B is an explanatory view showing a relative positional relation upon movement of the loading cam members in the loading mechanism of the major mechanism of the present information processing device;

DETAILED DESCRIPTION OF THE PREFERRED EMBODIMENTS

The embodiment of the present invention will be explained below with reference to the accompanying drawings.

Figure 1:
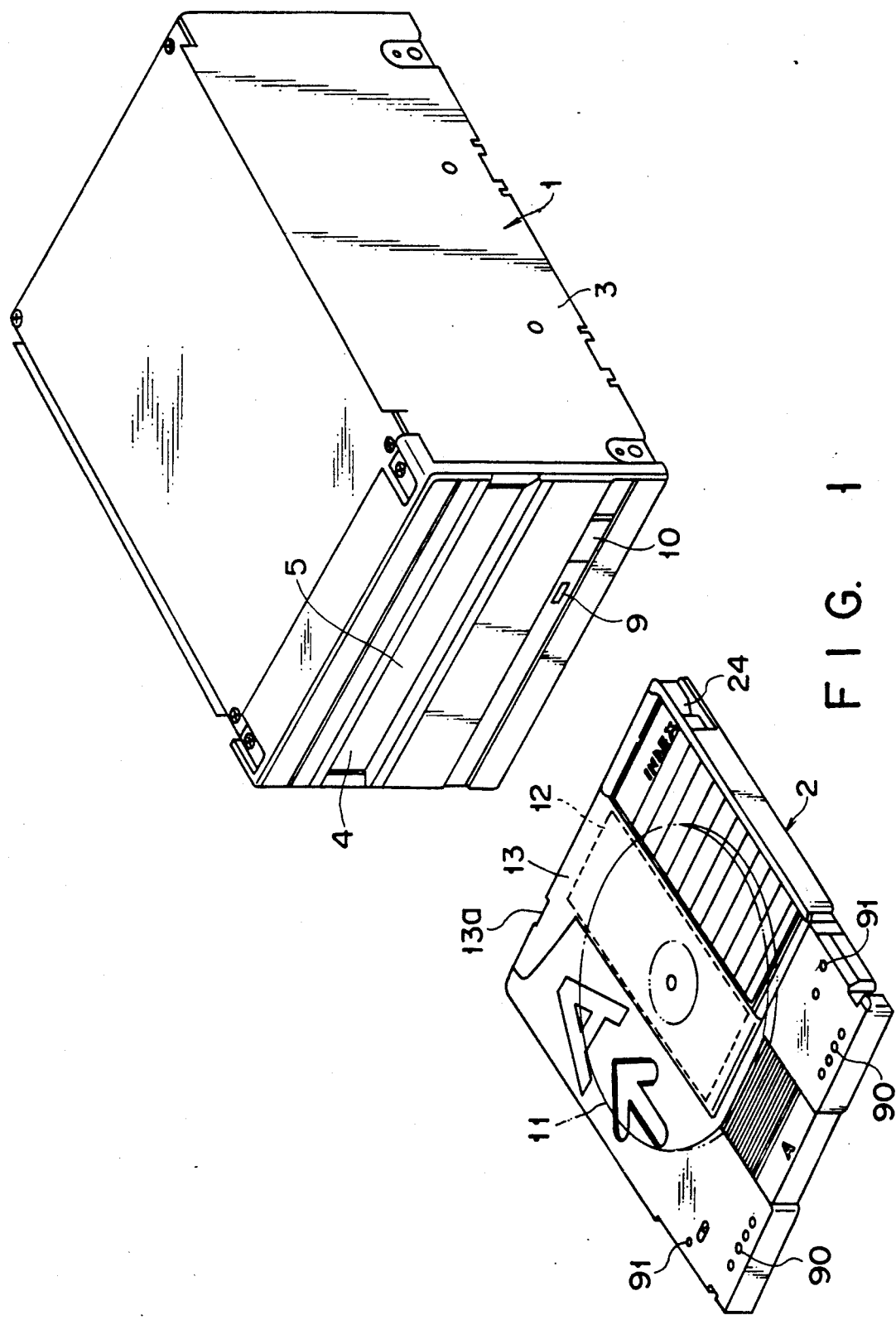
FIG. 1 is a perspective view showing an external appearance of an information processing device and cartridge.

FIG. 1 shows an outer appearance of an optical disc device 1 as an information processing device and a cartridge 2 associated with the optical disc device.

The optical disc device 1 includes a housing 1 having a cartridge access hole 5 provided at its front panel and adapted to be opened and closed by a shutter 4 and further includes an information processing device 8 (see FIG. 3) comprising a drive base mechanism 6 and loading mechanism 7 and a control circuit board, not shown, for driving the information processing device and loading mechanism 7.

A state display area 9 and eject switch 10 for cartridge ejection are provided at a right lower area of the front panel.

The cartridge 2 has an optical disc (hereinafter referred to simply as a disc) 11 of, for example, about 130 mm incorporated as an information recording medium, both the surfaces of the disc being usable as an A or a B side surface. A window 12 is formed at the cartridge 2 to partially expose the disc 11 and a shutter 13 is slidable to open and close the window 12.

The drive base mechanism 6 includes, as shown in FIG. 3, a disc rotation motor (not shown) having a turntable 16 for rotatably holding the disc 11, a record/-playback/erase head (laser beam illumination means) 18 movable in the direction of the diameter of the disc 11 by means of a linear motor 17 to allow a laser beam to be directed onto an information recording layer on the lower surface side of the disc 11 so that the information processing is carried out there.

The loading mechanism 7 includes, as shown in FIG. 3, a cartridge holder 20 mounted on the drive base 15 and comprised of a first holding member for holding the cartridge 2; an electromagnet holder 101 comprised of a second holding member for holding an electromagnet assembly 100 with an electromagnet 132 mounted thereon as a magnetic field generating means for information recording and erasure; loading cam members 21, 21 comprised of metal plates (first guide members) for allowing the cartridge holder 20 and electromagnet holder 101 to be moved to a predetermined position to hold them in place; and loading guide members 22, 22 comprised of metal plates (second guide members) for guiding the loading cam members 21, 21 and cartridge holder 20.

A snapper 23 is provided at each of the opposite side surfaces of the cartridge holder 20 and comprised of a leaf spring. Upon manual insertion of the cartridge into the cartridge holder, the snappers 23, 23 (only one is shown) are elastically fitted into snapper receivers 24, 24 (see FIG. 1) to hold the cartridge 2 in place. At this time, an actuator of a cartridge insertion detection switch 25 on the forward portion of the cartridge holder 20, upon insertion of the cartridge 2, determines that the cartridge 2 is held in place. In this way, a loading motor 26 starts its operation.

Figure 4C:
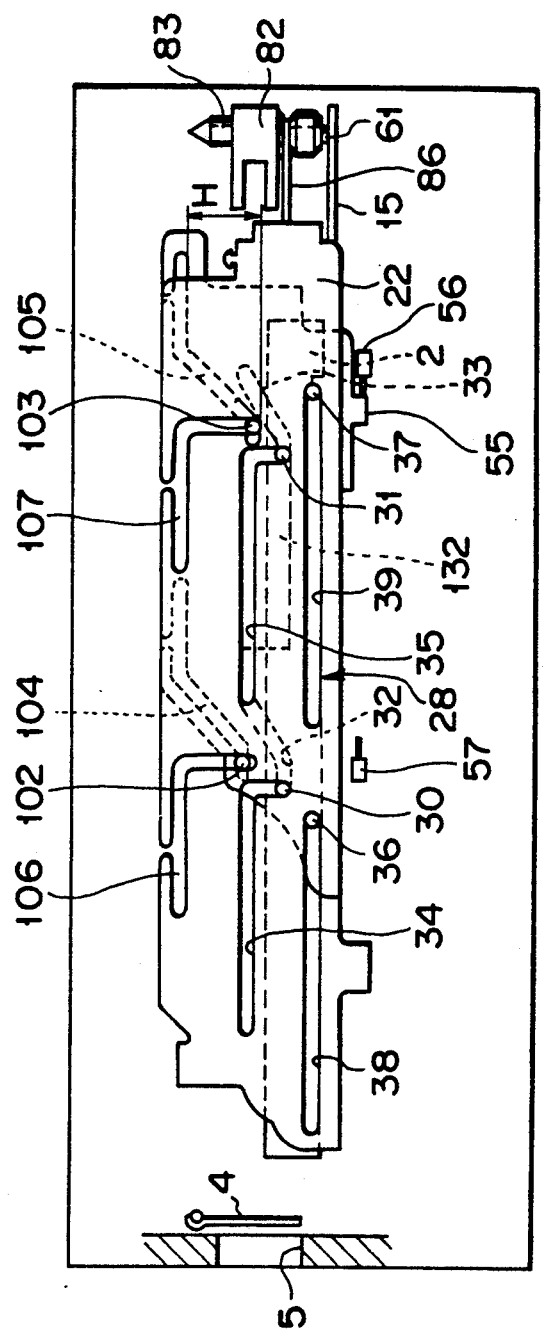
FIG. 4C is an explanatory view showing a relative positional relation upon movement of the loading cam members in the loading mechanism of the major mechanism of the present information processing device.

Holder guide pins 30, 31 are projected at both side surfaces of the cartridge holders 20, and, after passing through cam slits 32, 33 in the loading cam members 21, 21, guided into holder guide slits 34, 35 provided on the side surfaces of the loading guide members 22, as shown in FIGS. 4A to 4C.

Holder guide pins 102, 103 are projected on both side surfaces of the electromagnet holder 101 and, after passing through cam slits 104, 105 in the loading cam members 21, 21, guided into holder guide slits 106, 107 provided in the side surfaces of the loading guide member as shown in FIGS. 4A to 4C.

Cam member guide pins 36, 37 are projected on the side surfaces of the loading cam members 21 and guided into cam member guide slits 38, 39 provided on the side surfaces of the loading guide member 22. The loading cam members 21, 21 are movable in the direction in which the cartridge 2 is inserted.

The heads of the cam member guide pins 36, 37 projected toward the loading cam member 21 are made greater than the widths of the cam member guide slits 38 and 39 of the loading guide member 22 and the cam member guide pins 36 and 37 are inserted from the loading guide member 22 side crimped with the loading cam member 21 inside. Since the loading cam member 2 and loading guide member 22 constitute a guide means 28 for guiding the disc 11 and electromagnet (magnetic field generating means), they can be handled, as one unit, upon assembly, reducing an assembling time.

Figure 5:
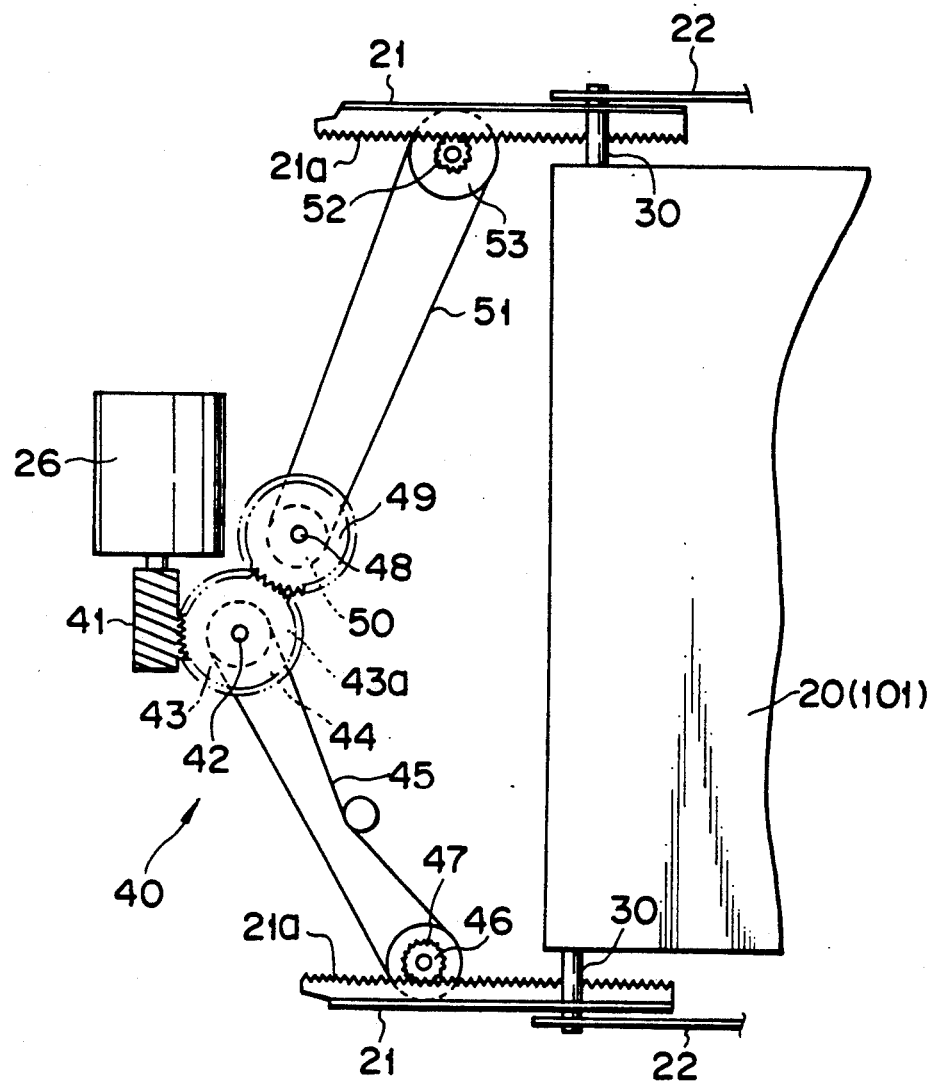
FIG. 5 is an explanatory view showing a drive means for driving the loading cam members.

A loading cam member driving means (guide member moving means) 40 for driving the loading cam members 21, 21 will be explained below with reference to FIG. 5.

A worm gear 41 is fixed to a drive shaft of the loading motor 26 serving as a drive source. The worm gear 41 engages with a worm wheel gear 43 rotatable with a pin 42 as a rotation center, the pin being fixed to the drive base 15. A pulley 44 is provided integral with the wheel gear 43 and an endless, toothed belt 45 is wrapped on the pulley 44. The toothed belt 45 is also wrapped on a pulley 47 integral with a first pinion 46 in mesh with a rack 21a provided as one portion of the loading cam member 21.

A worm wheel gear 43 is provided with an integral gear section 43a which engages with a reverse rotation gear 49 rotatable with a pin 48 as a rotation center, the pin being fixed to the drive base 15. A pulley 50 is provided integral with the reverse rotation gear 49 and an endless toothed belt 51 is wrapped on the pulley 50. The toothed belt 51 is wrapped on a pulley 53 integral with a second pinion 52 in mesh with a rack 21a provided on the other loading cam member 21.

A normal or a reverse rotation of the loading motor 26 allows the loading cam members 21, 21 to be moved back and forth, at an equal speed, in the same direction.

A relative positional relation among the cartridge holder 20, electromagnet holder 101, loading cam member 21 and loading guide member 22 upon movement of the loading cam members 21, 21 will be explained below with reference to FIGS. 4A to 4C.

When the cartridge 2 is inserted into the cartridge holder 20 and cartridge insertion detection switch 25 is operated, the loading motor 26 of the loading cam member drive means 40 (see FIG. 5) is rotated in a normal direction to allow the loading cam members 21, 21 to be moved in the direction of depth of the cartridge holder.

At this time, the cam member guide pins 36, 37 are guided along the linear cam member guide slits 38, 39 of the loading guide member 22 and the loading cam member 21 is moved in the horizontal direction. Further, the holder guide pins 30, 31 are guided along the linear portions of the holder guide slits 34, 35 of the loading guide member 20, allowing the cartridge holder 20, together with the loading cam member 21, to be moved as one unit in the horizontal direction, that is, the state as shown in FIG. 4A is brought to the state as shown in FIG. 4B.

The holder guide slits 34, 35 are down-turned in a direction substantially perpendicular to the horizontal direction above to provide an L-shaped slit each. When the holder guide pins 30 and 31 are moved along the linear portions of the slits to the down-turned points where the horizontal movement of the cartridge holder 20 is restricted and only the loading cam member 21 is allowed to continue its movement. By so doing, the guide pins 30 and 31 of the cartridge holder 20 begin their down movement at the down-turned corners of the holder guide slits 34 and 35 with the action of the cam slits 32 and 33 of the loading cam member 21 and are moved to substantially lowest positions where these guide pins are held in place as shown in FIG. 4C.

The loading cam member 21 is somewhat further moved in the horizontal direction and a stop switch 56 (see FIG. 4C) upon insertion of the cartridge is operated by a projection 55 provided on the loading cam member 21, stopping the loading motor.

By so doing, the disc 11 stored in the cartridge 2 is held in a third position to allow it to be illuminated with a laser beam coming from the record/playback/erase head 18 as a laser beam illumination means. Thereafter, an electromagnet (magnetic field generation means) 132 as will be explained below is held from a second position separated from the disc 11 to a first position where a magnetic field is applied to the disc 11 at a time of information playback.

In the process from the state as shown in FIG. 4A to the state shown in FIG. 4C, the shutter 13 of the cartridge 2 is brought to an open state by a cartridge shutter open/close mechanism 60 as will be set out below.

Figure 2:
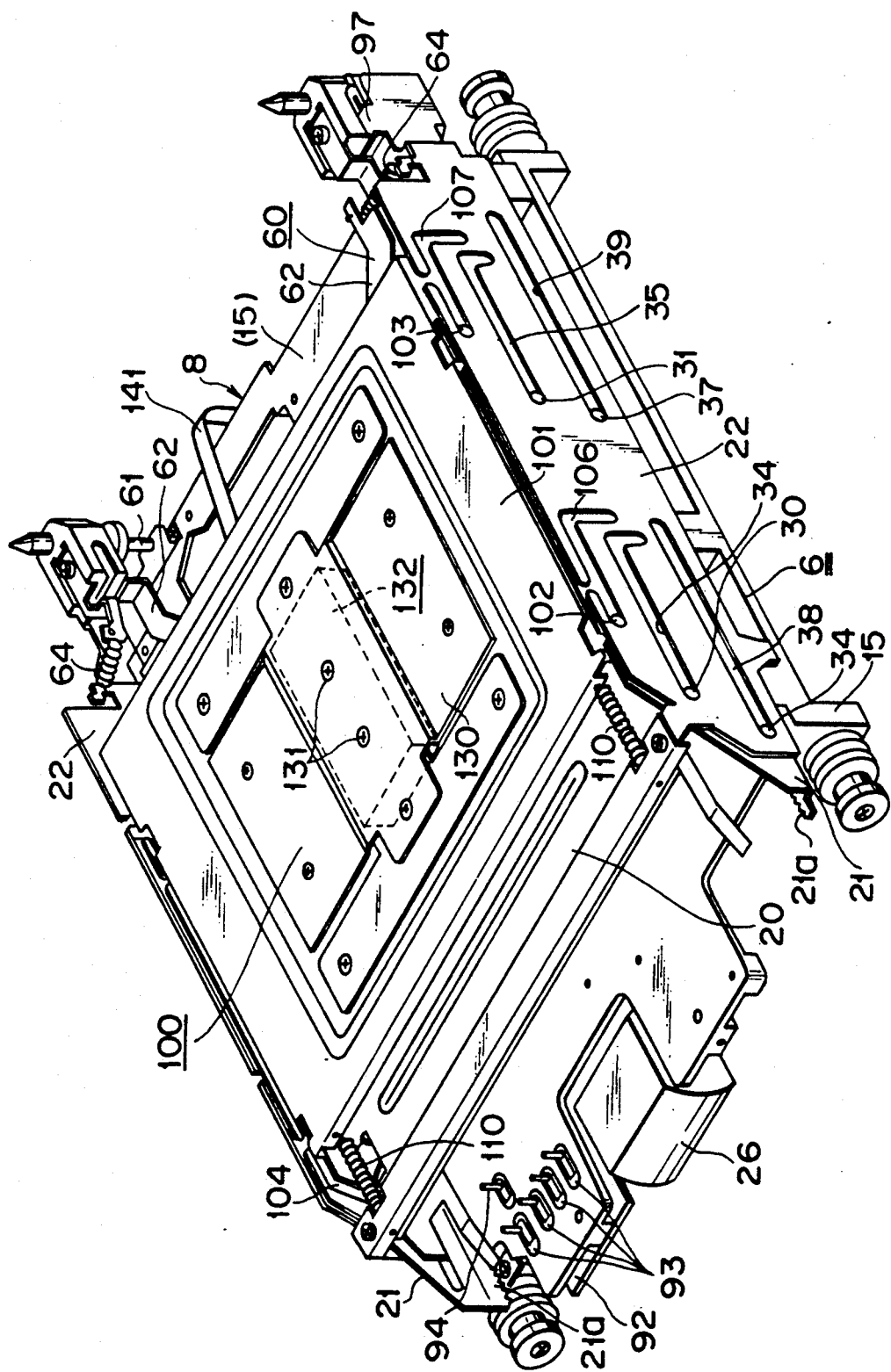
FIG. 2 is a perspective view showing an arrangement of a major section of the present information processing device.

On the other hand, the electromagnet holder 101 is normally urged by coil springs 110, 110 (see FIGS. 2) in a front direction of the present device so that it is located in its initial position. The Cam slits 104, 105 engaging With the electromagnet holder 101 of the loading cam member 21 have their linear portions started from the same height as that of the linear portions of the guide slits 106, 107 for the electromagnetic holder 101 of the loading guide member 22. Even if, therefore, the loading cam member 21 starts its horizontal movement, the electromagnet holder 101 does not immediately start its movement. When the cam slits 104, 105 reach the positions of the guide pins 102 and 103 of the electromagnet holder 101 at those locations where their linear portions enter their oblique portions, the electromagnet holder 101 starts its movement.

The reason is that, if the starting movement of the electromagnet holder 101 is not so timed as set out above, there occurs an interference between the electromagnet 132 and the open/close arm 62 of the shutter 13 of the cartridge 2.

Since the electromagnet holder 101 is moved at such a delayed timing as set out above, that is, after the open/close arm (right) has been moved fully toward the back side of the device, there occurs an interference between the arm 62 and the electromagnet 132.

In the case where there is an ample space in the height direction of the device, there is no such interference as set out above. However, height restriction is severely demanded due to a recent trend toward obtaining a compact unit and the arrangement as set out above in connection with the present embodiment can favorably reduce the thickness of a device obtained.

The holder guide slits 106, 107 of the loading guide member 22 are down-turned in a direction substantially perpendicular to their horizontal linear portions to provide an L-shaped slit each. When the holder guide pins 102, 103 reach a "down-turned" point past the linear portions of the holder guide slits 106, 107, the electromagnet 101 has its horizontal movement restricted so that only the loading cam member 21 continues its movement. By so doing, the electromagnet 132 is moved from the second position (see FIGS. 4A and 4B) remote from the disc 11 to above the first position (see FIG. 4C) where a magnetic field is applied to the disc 11 at the time of information playback.

Subsequently, the guide pins 102, 103 of the electromagnet holder 101 start their lowering movement along the oblique portions of the cam slits 106, 107 with an action of the cam slits 104, 105 of the loading cam member 21 and are moved down to a location where the cam slits 104 and 105 are brought to a horizontal level. The electromagnet 132 held by the holder 101 is held to the first position (see FIG. 4C) where a magnetic field is applied to the disc 11 at the time of information playback. At this time, as set out above, the disc 11 held in the cartridge 2 is placed in a third position where it is illuminated with a laser beam coming from the record/playback/erase head 18.

The height of the electromagnet 101 is determined by a height H (see FIG. 4C) defined between the upper and lower horizontal portions of the cam slits 104 and 105.

As already set out, the loading cam member 21 is somewhat further moved and a mount-completing detection switch is operated by the projection 55 provided on the loading cam member 21, stopping the loading motor 26.

The loading guide member 22 for guiding the loading cam member 21 is mounted on the drive base 15, whereby it is possible to readily and accurately set a distance relative to the disc 11 on a turntable (spindle motor) 16 which is set to the drive base 15.

Further, the cartridge holder 20 and electromagnet holder 101 are so arranged that, in their initial position, the holder guide pins 30, 31, 102, 103 have their movement positionally restricted relative to the cam slits 32, 33 of the loading member 21 and holder guide slits 34, 35, 106, 107 of the leading guide member 22, stably holding the electromagnet 132 in place without being adversely affected by, for example, an external vibration.

The cartridge shutter open/close mechanism 60 has an arrangement as will be set out below.

As shown in FIG. 3, arm rotation center pins 61, 61 are arranged at the rear side of the drive base 15 and open/close arms (link mechanism) 62, 62 are rotatably provided one on the right and one on the left side through the arm rotation center pins 61, 61. At the forward ends of the open/close arms 62, 62 are provided cartridge shutter open/close pins 63, 63 fitted in cutouts 13a, 13a of the shutter 13 of the cartridge 2.

Upon movement of the cartridge 2 in the device 1 with the cartridge 2 inserted into the cartridge holder 20, the open/close arms 62, 62 are rotated against an urging force of open/close arm return springs 64 and the shutter 13 is selectively moved by the open/close arms 62, 62 with the open/close pins 63 fitted in the shutter cutouts. Upon insertion of the cartridge 2 with its face reversed, the shutter 13 is moved in an opposite direction.

The shutter 13 is fully opened before the cartridge 2 starts its lowering movement in the loading mechanism 7. With the cartridge 2 lowered, the disc 11 is mounted on the turntable 16 of the disc rotation motor. The optical head 18 is held in a window 12 of the cartridge 2, being in readiness for a recording, playback and erasure.

Four ID holes 90, . . . at max. for representing the properties of the A and B faces of the disc 11 are provided at the cartridge 2. Also provided there are write-protect holes 91, 91 which represent whether or not the writing of information is allowed (see FIG. 1). In the device 1 side, the ID holes 90, . . . and write protect holes 91, 91 are detected by the ID hole detection sensor 93, . . . and write protect hole detection sensor 94, enabling an intended operation to be done.

The ID hole detection sensor 93, . . . and write protect hole detection sensor 94 are located on a disc rotation motor control circuit board 92 in a manner to be provided integral with the disc rotation motor equipped with the turntable 16.

In the arrangement shown in FIG. 3, 95, 95 represent cartridge push-down springs provided on the cartridge holder 20; 96, an open/close arm guide body for guiding the open/close arms 63, 63 of the cartridge shutter open/close mechanism 60; and 97, a positioning member for positioning the upper and lower levels of the open/close arm holder 97.

After information processing, the eject operation of the cartridge 2 is effected when the loading motor 26 of the loading cam member drive means 40 is reversely rotated by a cartridge eject signal. By so doing, a reverse operation is carried out in a process opposite to the insertion process as explained in connection with FIGS. 4A to 4C and the cartridge 2 is partially ejected back from the cartridge access hole 5. In the partially ejected state, the stop switch 57 (see FIG. 4A) is depressed by the projection 55 provided integral with the loading cam member 21, stopping the motor.

In the cartridge eject operation process, the operation opposite to the shutter opening operation is performed in the cartridge shutter open/close mechanism 60. As a result, the shutter 13 of the cartridge 2 is closed and a projection of an elastic lever (either is not shown) engages with a locking window of the shutter 13 to lock the shutter 13.

The cartridge 2 can be manually withdrawn away from the optical disc device because it is returned back to the initial insertion position.

Figure 6:
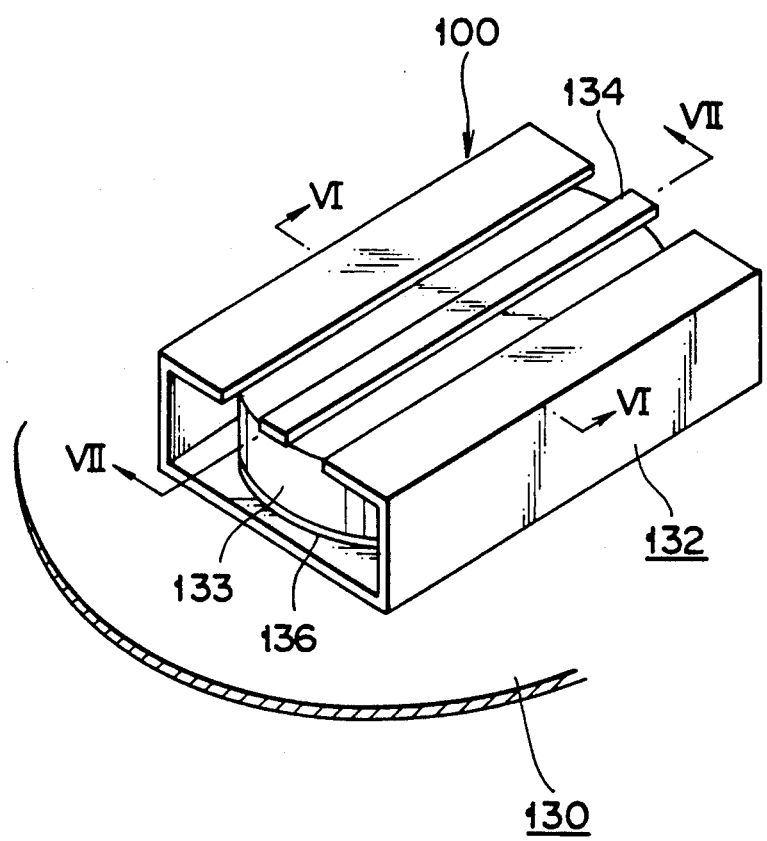
FIG. 6 is a perspective view diagrammatically showing an electromagnet assembly.
Figure 7:
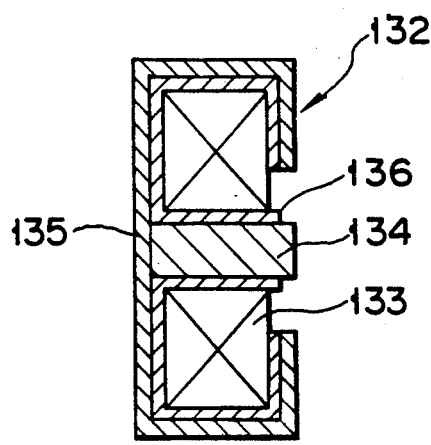
FIG. 7 is a cross-sectional view taken along line VII—VII in FIG. 6.
Figure 8:
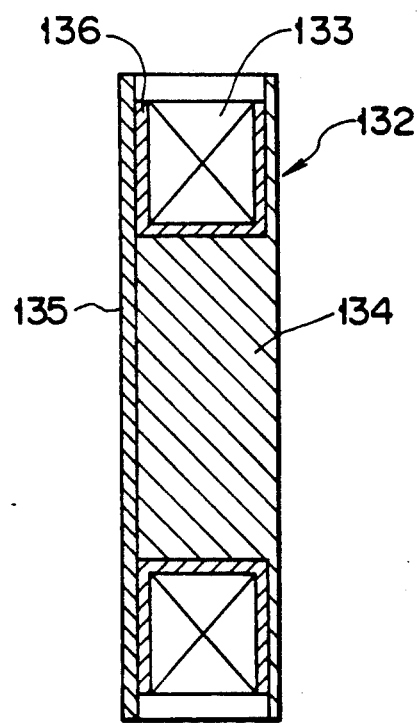
FIG. 8 is a cross-sectional view taken along line VIII—VIII in FIG. 6.

The electromagnet assembly 100 is generally comprised of, as shown in FIGS. 6 and 7, a support plate 130 and electromagnet 132 mounted by screws 131, . . . to the support plate 130 to apply an external magnetic field.

The electromagnet 132 comprises an excitation coil 133, main magnetic pole 134, auxiliary magnetic pole 135 and electrically-insulating heat conducting material 136.

The excitation coil 133 is heated to a high temperature resulting from the passage of electric current there by the application of a magnetic field, making it necessary to transmit heat to the main magnetic pole 134 and auxiliary magnetic pole. It is, therefore, not possible to provide an ensured electrical insulation and ensured contact with the excitation coil 133. In the present embodiment, an electrically-insulating, excellent heat-conducting, thin material 136 having better contact at an uneven surface is disposed between the excitation coil 133 and the main magnetic pole 134 and between the auxiliary magnetic coil 135 and the excitation coil 133. It is thus possible to provide an ensured insulation as well as an ensured heat dissipation.

As the electrically-insulating heat-conducting material 136 use is made of a structural silicon material, preferably silicon fluoride, containing a boron nitride as a filler and reinforced with reinforced glass fibers to provide adequate protection against a tearing or breakage.

This material has, for example, nearly the following values:
Heat Impedance (°C.-in$^2$/watt)
  38–42 (flat plate test value)
  42–46 (TO-3 test value)
Thermal Conductivity (Btu-in/Hr-ft$^2$-F):14
  Voltage Drop Level (VAC) min
  Thickness: 0.5±0.10 mm.

By so doing, the electromagnet 136 has a better heat dissipation, reducing the heat generation of the electromagnet 132. Therefore, the excitation coil 133 obviates the need of increasing its volume and hence decreases the size of the electromagnet 132.

In the prior art, the excitation coil 133 is fixed to the main magnetic pole 134 with an electrically insulating material placed therebetween and an air gap is provided between the excitation coil 133 and the auxiliary magnetic pole 135 to ensure electric insulation. However, a low heat dissipation occurs at the magnetic coil 133 and a problem arises on the heat generation of the excitation coil 133.

Further, since the excitation coil 133 is made greater in its volume so as to lower the dissipation power and hence to decrease the heat dissipation, there is a bar to obtaining a compact information processing device.

Figure 9:
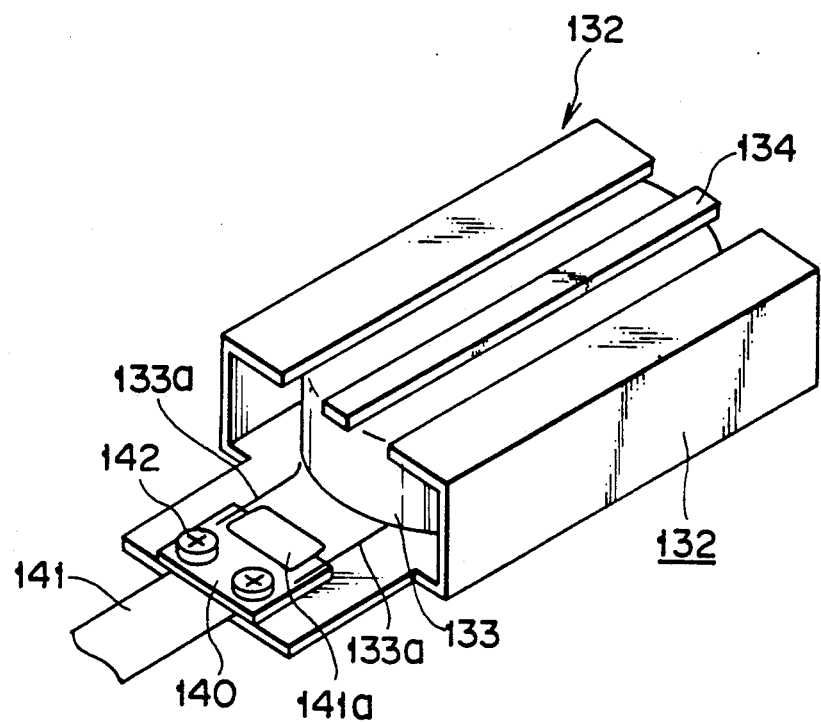
FIG. 9 is a perspective view showing a section for fixing an electric wire of the electromagnet.

FIG. 9 shows the electromagnet 132 and an electric wire fixing section for supplying electric current upon application of a magnetic field.

In FIG. 9, those terminals 133a, 133a of the excitation coil 133 in the electromagnet 132 are soldered to the printed board 140, and a terminal 141a of a current supply wire 141 is soldered to the printed board 140. The current wire 141 runs below the lower surface of the printed board 140 and, together with the printed board, is fixed to the electromagnet holder 101 with the use of screws 142.

The other terminal of the current supply wire 141 is connected to a printed board 145 on the power supply side through a connector, not shown.

Figure 10:
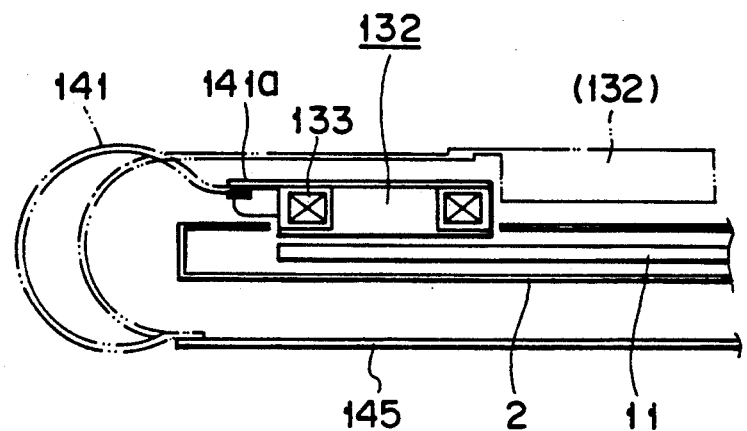
FIG. 10 is a view showing the movement of the electromagnet with the electric wire curved.
Figure 11:
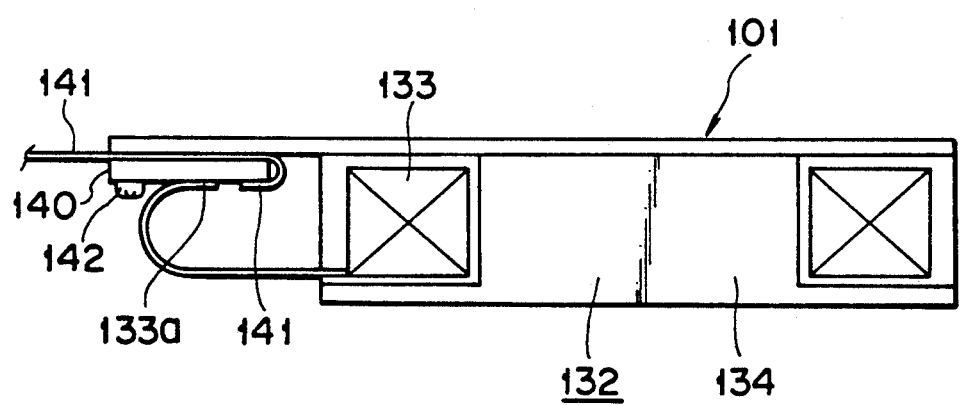
FIG. 11 is a view showing an enlarged portion of the arrangement shown in FIG. 10.

FIG. 10 shows the position of movement of the electromagnet 132 and curved state of the electric wire 141. With the cartridge 2 in an inserted position the electromagnet 132 is located near the disc 11 and the current supply wire 141 is placed in a curved state with the cartridge inserted into the cartridge 2. Further, with the cartridge in an ejected state, the electromagnet 132 is located outside the cartridge 2 at which time the current supply wire 141 assumes a configuration other than the aforementioned curved state. The configuration of the current supply wire conventionally inflicts a load to the terminal 141a of the current supply wire 141.

According to this invention, the current supply wire 141 is fixed in place by screws 142 in a way to be pushed down with the printed board 145, absorbing a load resulting from the aforementioned configuration, that is, accommodating a variation in the curved state of the current supply wire 141 which might otherwise occur on a soldered spot at the terminal 141a of the current supply wire 141.

In this way, the load as set out above is not transmitted to the soldered spot, never causing a breakage at the soldered spot as well as at the current supply wire 141 near the soldered spot. It is thus possible to provide an ensured conduction there. Further, it is not necessary to add any special wire fixing member or means to the device, because the current supply wire 141 is pushed down with the printed board 145.

Although the present invention has been explained as being applied to the storing of an information storage medium, for example, in a cartridge, but it can be used to directly handle the information storage medium.

The present invention is not restricted to the aforementioned embodiment only. Various changes or modifications of the present invention can be made without deporting from the spirit and scope of the present invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A device for storing information in an information storage medium by directing a light beam with a magnetic field applied to the information storage medium, comprising:

light beam generating means for generating the light beam;

magnetic field generating means for generating the magnetic field;

housing means for housing the light beam generating means and magnetic field generating means, the housing means having an access hole through which the information storage medium is inserted;

support means for supporting both the information storage medium inserted via the access hole into the housing means and the magnetic field generating means such that the information storage medium and magnetic field generating means are movable along the storage medium insertion direction, and in a direction included to the storage medium insertion direction, the support means being so provided at the housing means as to be movable along the storage medium insertion direction;

movable means for moving the support means in a direction corresponding to the storage medium insertion direction; and guide means for guiding the support means, which is moved by the movable means, in the storage medium insertion direction and for guiding the storage medium to a position where the medium faces the light beam generating means and the magnetic field generating means to a position where the magnetic field generating means faces the light beam generating means through the storage medium.

2. The device according to claim 1, wherein said magnetic field generating means is comprised of an electromagnet.

3. The device according to claim 2, wherein said electromagnet includes an excitation coil, main magnetic pole, auxiliary magnetic pole, an electrically insulating heat conducting material, printed board and electric wire for current supply.

4. The device according to claim 3, wherein said electrically insulating heat conducting material is provided between the excitation coil and the main magnetic pole and between the excitation coil and the auxiliary magnetic pole.

5. The device according to claim 3, wherein said electrically insulating heat conducting member is comprised of a silicon fluoride structural member containing a boron nitride as a filler and reinforced with reinforced glass fibers to maintain its structural integrity.

6. The device according to claim 3, wherein said electromagnet is of such a type that a terminal of the excitation coil is soldered to the printed board and a terminal of the electric wire for current supply is soldered to the printed board with the electric wire fixed in place in a manner to be sandwiched between the printed board and an associated mounting member.

7. A device for playing back at least information from an information storage medium by directing a laser beam onto the information storage medium, under an application of a magnetic field, with the information recorded on the information storage medium, comprising;

a housing having an access hole through which the information storage medium is inserted;

laser beam illumination means provided in the housing and adapted to provide an illumination using the laser beam;

magnetic field generating means, provided in the housing, for generating the magnetic field;

a first holding member for holding the information storage medium;

a second holding member for holding the magnetic field generating means;

guide means for guiding the information storage medium to a position where the information storage medium is illuminated with the laser beam coming from the laser beam illumination means and for guiding the magnetic field generating means to a position where a magnetic field is applied to the information storage medium, the guide means having a movable first guide member for guiding the first and second holding members in the same information storage medium insertion direction and a fixed second guide means for allowing the first guide member and first holding member to be guided; and guide member moving means for moving the first guide member of the guide means.

8. The device according to claim 7, wherein said first guide member is comprised of a plate having guide slits for allowing guide pins projected from the first holding member and second holding members to be guided; and said second guide member is comprised of a plate having guide slits for allowing guide pins projected from the first guide member and first holding member to be guided.

9. The device according to claim 8, wherein said first and second guide members have a plurality of similar guide slits each; and said first and second holding members and first guide member have a plurality of projecting guide pins each.

10. The device according to claim 8, wherein heads of the guide pins projected from the first guide member are greater than the width of the guide slits of the second guide member and said guide pins are inserted from a second guide member side and crimped at their other ends with the first guide member inside.

11. The device according to claim 8, wherein said first and second guide members are provided one at each side of the access hole through which the information storage medium is inserted.

12. The device according to claim 7, wherein said magnetic field generating means is comprised of an electromagnet.

13. The device according to claim 8, wherein said electromagnet is comprised of an excitation coil, main magnetic pole, auxiliary magnetic pole, electrically insulating heat conducting member, printed board and electric wire for current supply.

14. The device according to claim 13, wherein the electrically insulating heat conducting member is provided between the excitation coil and the main magnetic pole and between the excitation coil and the auxiliary magnetic pole.

15. The device according to claim 13, wherein the electrically insulating heat conducting member i comprised of a silicon fluoride structural member containing a boron nitride as a filler and reinforced with reinforced glass fibers to maintain its structural integrity.

16. The device according to claim 13, wherein the electromagnet is of such a type that a terminal of the excitation coil is soldered to the printed board and a terminal of the electric wire for current supply is soldered to the printed board with the electric wire fixed in place in a manner to be sandwiched between the printed board and an associated mounting member.

17. A device for playing back at least information from an information storage medium by directing a laser beam onto the information storage medium, under an application of a magnetic field, with the information recorded on the information storage medium, comprising:

a cartridge holder for holding the information storage medium and having a window for partially exposing the information storage medium and shutter for opening and closing the window;

a housing having an access hole through which the cartridge is inserted;

laser beam illumination means, provided in the housing, for providing an illumination using the laser beam;

shutter opening/closing means for opening and closing the shutter of the cartridge;

magnetic field generating means, provided in the housing, for generating the magnetic field, the magnetic field generating means being movable along the cartridge insertion direction from a first position where, upon information playback, the magnetic field is applied to the information storage medium to a second position spaced apart from the first position; and guide means which, while holding a positional relation between the information storage medium being inserted through the access hole and the magnetic field generating means, guides the information storage medium to a third position where, upon information playback, information storage medium is illuminated with the laser beam coming from the laser beam illumination means and guides the magnetic field generating means from the second position to the first position after the shutter has been released by the shutter opening/closing means.

18. The device according to claim 17, wherein the cartridge has engaging members for opening and closing the shutter and the shutter opening/closing means has pins engaging with the engaging members and pair of arms swingable in a direction of the opening or closing of the shutter when the cartridge is inserted into the housing.

19. The device according to claim 17, wherein the magnetic field generating means is comprised of an electromagnet.

20. The device according to claim 19, wherein the electromagnet is comprised of an excitation coil, main magnetic pole, auxiliary magnetic pole, electrically insulating heat conducting material, printed board and electric wire for current supply.

21. The device according to claim 20, wherein the electrically insulating conducting member is provided between the excitation coil and the main magnetic pole and between the excitation coil and the auxiliary magnetic pole.

22. The device according to claim 20, wherein the electrically insulating conducting member is comprised of a silicon fluoride structural member containing a boron nitride as a filler and reinforced with reinforced glass fibers to maintain its structural integrity.

23. The device according to claim 19, wherein the electromagnet is of such a type that a terminal of the excitation coil is soldered to the printed board and a terminal of the electric wire for current supply is soldered to the printed board with the electric wire fixed in place in a manner to be sandwiched between the printed board and the engaging member.

* * * * *